United States Patent Office 2,698,851
Patented Jan. 4, 1955

2,698,851

N-SUBSTITUTED PHTHALIMIDE COMPOUND AND METHOD FOR OBTAINING THE SAME

Loren M. Long, Grosse Pointe Woods, and Helen I. Scholl, River Rouge, Mich., assignors to Parke, Davis & Company, Detroit, Mich., a corporation of Michigan No Drawing. Application February 12, 1952, Serial No. 271,282

1 Claim. (Cl. 260—326)

This invention relates to a N-substituted phthalimide compound manifesting chemotherapeutic activity and to a process for preparing the same. More particularly, the invention relates to the production of N-methyl hexahydrophthalimide having the formula,

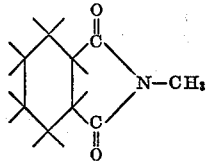

In accordance with the invention, the above product is produced by reacting hexahydrophthalic acid or hexahydrophthalic anhydride with at least one chemical equivalent of methylamine and heating the intermediate product so produced at a temperature between about 100° and 350° C.

In carrying out the initial portion of the process, it is advantageous to employ a solvent such as water, a lower aliphatic alcohol or a mixture of the same. The relative quantities of the reactants is not particularly critical, but from the standpoint of economy at least one and preferably several equivalents of methylamine should be used for each equivalent of the hexahydrophthalic acid or anhydride. The intermediate products differ depending on which starting material is employed, as well as on the amount of methylamine used. When the hexahydrophthalic anhydride is used with one equivalent of methylamine, the intermediate is the half amide; while, if two or more equivalents of methylamine are used, the intermediate product is the methylamine salt of the half amide of hexahydrophthalic acid. In the case where hexahydrophthalic acid is used as the starting material, the intermediate product is either the mono- or the dimethylamine salt of hexahydrophthalic acid. As stated previously, these intermediate products are converted to the desired N-methyl hexahydrophthalimide by heating them at a temperature between about 100 and 350° C. The preferred temperature for this conversion is in the neighborhood of 250 to 300° C. at which temperature the reaction is complete in about one hour.

The product of the invention possesses valuable therapeutic properties and is particularly useful in the treatment of the petit mal type of epilepsy.

The invention is illustrated by the following examples.

Example 1

10 g. of hexahydrophthalic anhydride is dissolved in 8 cc. of water containing 40 per cent by weight of methylamine at room temperature. The water is distilled from the reaction mixture and the residue heated at 250 to 300° C. for approximately one hour. The residue is distilled in vacuo to obtain the desired N-methyl hexahydrophthalimide; M. P. 52–54° C. Yield: 92 per cent.

Example 2

10 g. of hexahydrophthalic acid is dissolved in 8 cc. of water containing 40 per cent by weight of methylamine at room temperature. The water is removed by distillation and finally distilled in vacuo to obtain the desired N-methyl hexahydrophthalimide; M. P. 52–54° C.

What we claim is:

N-methylhexahyrophthalimide.

References Cited in the file of this patent

UNITED STATES PATENTS 2,524,145   Tawney _____ Oct. 3, 1950

OTHER REFERENCES

Chem. Abst., vol. 44, p. 1223c, citing Travis et al., J. Econ. Entomol., 42, pp. 686–94 (1949).

Beilstein: Handbuch der Organischen Chemie, vol. 21, p. 461, citing Freund et al., Berichte 37 (1945).